(12) United States Patent
Paulzagade et al.

(10) Patent No.: US 10,180,801 B2
(45) Date of Patent: Jan. 15, 2019

(54) SYSTEMS AND METHODS FOR LOAD BALANCING BACKUP DATA

(71) Applicant: Veritas Technologies LLC, Mountain View, CA (US)

(72) Inventors: Sudhakar Paulzagade, Pune (IN); Pradip Kulkarni, Pune (IN)

(73) Assignee: Veritas Technologies LLC, Mountain View, CA (US)

( * ) Notice: Subject to any disclaimer, the term of this patent is extended or adjusted under 35 U.S.C. 154(b) by 66 days.

(21) Appl. No.: 15/596,992

(22) Filed: May 16, 2017

(65) Prior Publication Data

US 2018/0335960 A1    Nov. 22, 2018

(51) Int. Cl.
*G06F 3/06* (2006.01)

(52) U.S. Cl.
CPC ............ *G06F 3/0619* (2013.01); *G06F 3/065* (2013.01); *G06F 3/067* (2013.01); *G06F 3/0613* (2013.01); *G06F 3/0643* (2013.01); *G06F 3/0635* (2013.01); *G06F 3/0646* (2013.01); *G06F 3/0683* (2013.01)

(58) Field of Classification Search
CPC ...... G06F 3/0619; G06F 3/0643; G06F 3/065; G06F 3/067; G06F 3/0613; G06F 3/0635; G06F 3/0646; G06F 3/0683

USPC .................................................. 711/161, 162
See application file for complete search history.

(56) References Cited

U.S. PATENT DOCUMENTS

| | | | |
|---|---|---|---|
| 2011/0283073 A1* | 11/2011 | Amarendran | G06F 3/0619 711/162 |
| 2013/0279378 A1* | 10/2013 | Niea | H04B 3/36 370/293 |
| 2014/0149355 A1* | 5/2014 | Gupta | G06F 17/30008 707/652 |
| 2017/0026263 A1* | 1/2017 | Gell | H04L 43/0882 |
| 2017/0118013 A1* | 4/2017 | Simek | H04L 67/1097 |

* cited by examiner

*Primary Examiner* — Shane D Woolwine
(74) *Attorney, Agent, or Firm* — FisherBroyles LLP

(57) ABSTRACT

The disclosed computer-implemented method for load balancing backup data may include (1) receiving a request to backup files in a multi-node computing cluster, (2) identifying a backup distribution of the files among multiple backup clients, (3) reading an initial data block of a current file from a data node in the cluster, (4) reading a copy of the initial data block of an additional file from another data node in the cluster, (5) reading a subsequent data block of the current file from the data node in the cluster, and (6) balancing backup of the current and additional files among the data node and the another data node by reading a copy of a subsequent backup data block of the additional file from the another data node in the multi-node computing cluster. Various other methods, systems, and computer-readable media are also disclosed.

20 Claims, 4 Drawing Sheets

SYSTEMS AND METHODS FOR LOAD BALANCING BACKUP DATA

BACKGROUND

In an era of constant connectivity, an inability to efficiently backup and recover large sets of data can be a severe liability. Traditional systems may utilize a scale-out backup architecture that divides and distributes large backup workloads across multiple proxy clients of computing cluster nodes. However, the workload distribution of backup workloads in traditional systems may result in the proxy clients fetching backup data blocks from the computing cluster nodes in an uneven manner, thereby overutilizing (e.g., overloading) some nodes while underutilizing others during backup input/output operations. The instant disclosure, therefore, identifies and addresses a need for systems and methods for load balancing backup data.

SUMMARY

As will be described in greater detail below, the instant disclosure describes various systems and methods for load balancing backup data by (1) receiving a request to backup files in a multi-node computing cluster, (2) identifying a backup distribution of the files among multiple backup clients, (3) reading an initial data block of a current file from a data node in the cluster, (4) reading a copy of the initial data block of an additional file from another data node in the cluster, (5) reading a subsequent data block of the current file from the data node in the cluster, and (6) balancing backup of the current and additional files among the data node and the another data node by reading a copy of a subsequent backup data block of the additional file from the another data node in the multi-node computing cluster.

In some examples, the method may include storing at least the initial and subsequent backup data blocks of the current file to a storage system. Additionally or alternatively, the method may include storing at least the copies of the initial and subsequent backup data blocks of the additional file to a storage system.

In some examples, identifying a backup distribution of the files among a plurality of backup clients may include retrieving backup distribution data from a name node in the multi-node computing cluster. The multi-node computing cluster may include a Hadoop Distributed File System (HDFS).

In some examples, reading a copy of an initial backup data block of an additional file from the another data node may include reading the copy of the initial backup data block in parallel with reading the initial backup data block of the current file from the data node. In some examples, reading a copy of a subsequent backup data block of the additional file from the another data node may include reading the copy of the subsequent backup data block in parallel with reading the subsequent backup data block of the additional file from the data node.

In one example, a system for load balancing backup data may include several modules stored in memory, including (1) a reception module that receives a request to backup files in a multi-node computing cluster, (2) an identification module that identifies a backup distribution of the files among a plurality of backup clients, (3) a backup reading module that reads an initial backup data block of a current file from a data node and reads a subsequent backup data block of the current file from the data node in the multi-node computing cluster, and (4) another backup reading module that reads a copy of the initial backup data block of an additional file from another data node and balances backup of the current and additional files among the data node and the another data node by reading a copy of a subsequent backup data block of the additional file from the another data node in the multi-node computing cluster. In addition, the system may include at least one physical processor that executes the reception module, the identification module, the backup reading module, and the another backup reading module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive a request to backup files in a multi-node computing cluster, (2) identify a backup distribution of the files among multiple backup clients, (3) read an initial data block of a current file from a data node in the cluster, (4) read a copy of the initial data block of an additional file from another data node in the cluster, (5) read a subsequent data block of the current file from the data node in the cluster, and (6) balance backup of the current and additional files among the data node and the another data node by reading a copy of a subsequent backup data block of the additional data file from the another data node in the multi-node computing cluster.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
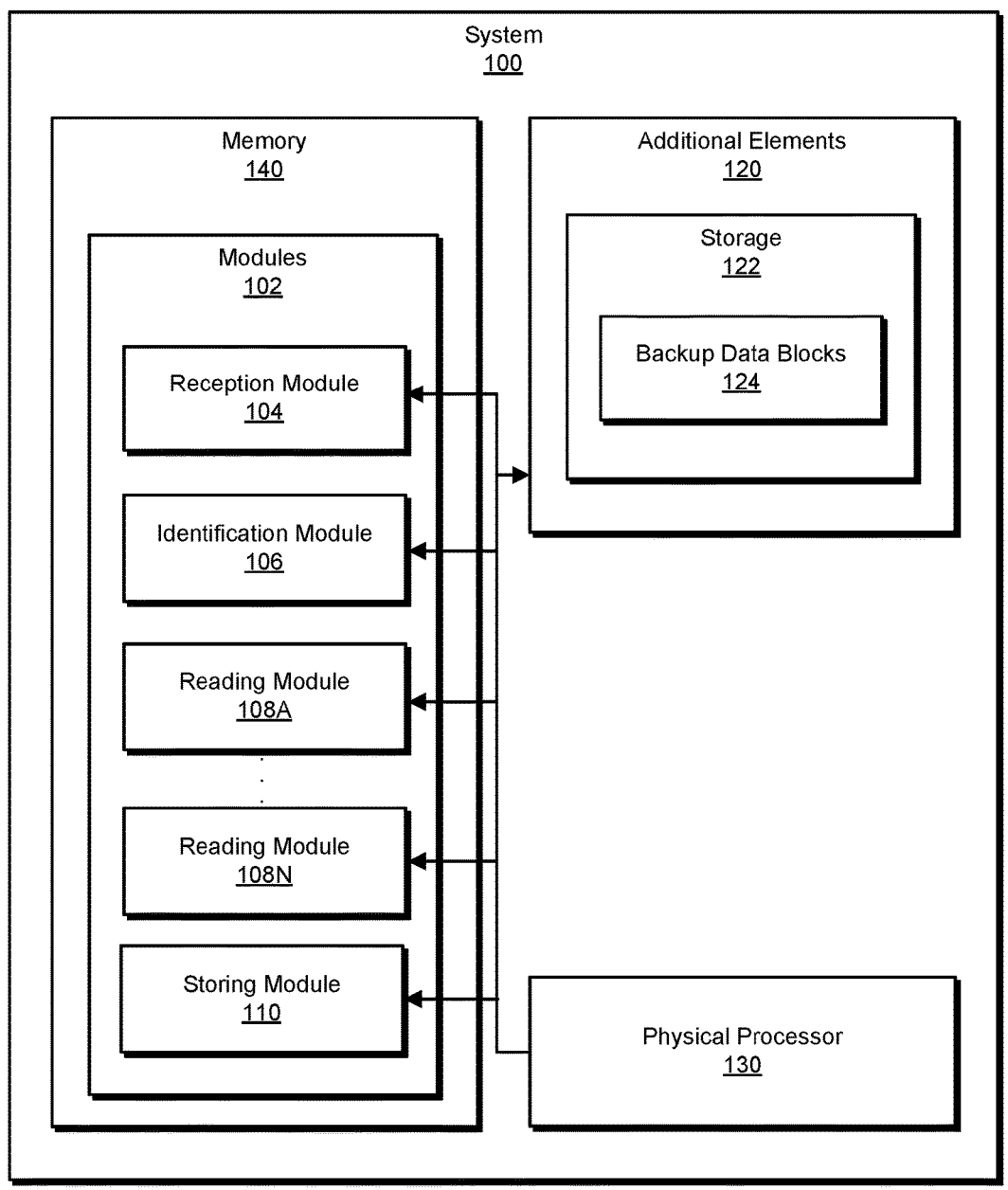
FIG. 1 is a block diagram of an example system for load balancing backup data.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for load balancing backup data. As will be explained in greater detail below, after receiving a request to backup files in a multi-node computing cluster, the disclosed systems and methods may identify a backup distribution of the files among multiple backup clients and read both backup file blocks and copies of backup file blocks from multiple data nodes. As such, the systems and methods described herein may enable users to effectively perform load balanced file backups by reading replica file blocks in parallel along with the original file blocks from multiple nodes in a multi-node computing cluster, rather than only reading original file blocks, which may result in bottlenecking only a few nodes while leaving other nodes untouched.

Moreover, the systems and methods described herein may improve the functioning of backup servers by improving the distribution of backup workloads across multiple nodes in a cluster. These systems and methods may also improve the field of performing load balanced server backups by optimizing the use of nodes in a computer cluster, which may maximize resource use while avoiding the overloading of any nodes in the cluster, leading to faster backup operations.

Figure 2:
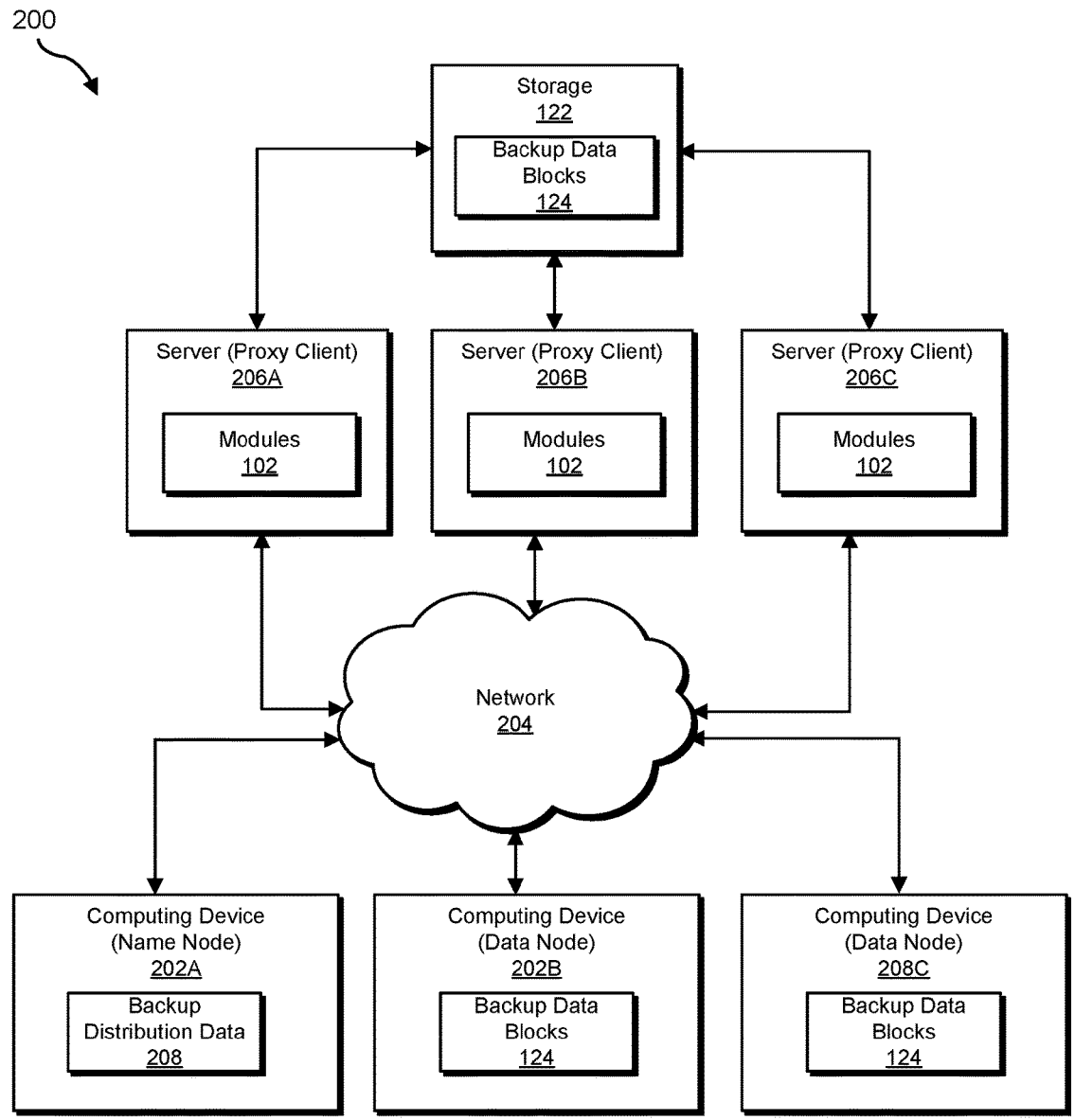
FIG. 2 is a block diagram of an additional example system for load balancing backup data.

The following will provide, with reference to FIGS. 1-2, detailed descriptions of example systems for load balancing backup data. Detailed descriptions of corresponding computer-implemented methods will also be provided in connection with FIG. 3. In addition, detailed descriptions of additional example [systems for load balancing backup data will also be provided in connection with FIG. 4].

FIG. 1 is a block diagram of an example system 100 for load balancing backup data. As illustrated in this figure, example system 100 may include one or more modules 102 for performing one or more tasks. As will be explained in greater detail below, modules 102 may include a reception module 104 that receives a request to backup files in a multi-node computing cluster, an identification module 106 that identifies, based on the request, a backup distribution of the files among multiple backup clients, reading modules 108A-108N that read backup data blocks and copies of backup data blocks of files from data nodes in the multi-node computing cluster, and a storing module 110 that stores the backup data blocks of the files from the data nodes in the multi-node computing cluster. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate load balancing backup data. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 may also include backup storage, such as storage 120. Storage 120 generally represents any type or form of backup storage device or devices for storing backup data blocks 122 read by the reading modules 108A-108N from data nodes in a multi-node computing cluster.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by server 206 and/or any other suitable computing system. As will be described in greater detail below, one or more of modules 102 from FIG. 1 may, when executed by at least one processor of server 206, enable server 206 to load balance backup data.

Computing devices 202A-202C generally represent any type or form of computing device capable of reading computer-executable instructions. In one example, computing devices 202A-202C may represent a multi-node computing cluster that maintains backup files in the form of multiple data blocks. For example, computing device 202A in the cluster may represent a name node for storing backup distribution data 208 (e.g., a backup distribution workload) for the computing devices 202B and 202C. In one embodiment, the computing devices 202B and 202C may represent data nodes for storing backup data blocks 124 that are read by the reading modules 108A-108N of FIG. 1. In one embodiment, the multi-node computing cluster may be an HDFS/HBase cluster. Additional examples of computing devices 202A-202C include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, or any other suitable computing device.

Servers 206A-206C generally represent any type or form of computing device that is capable of that is capable of an application used to read backup data blocks from a multi-node computing cluster. In one example, servers 206A-206C may represent multiple NETBACKUP servers, functioning as multiple proxy clients, that utilize the modules 102 to receive backup distribution data 208 from the computing device 202A and read backup data blocks 124 from computing devices 202B and 202C in a multi-node cluster. The servers 206A-206C may further be configured to store the backup data blocks 124 in storage 122. Additional examples of servers 206 include, without limitation, storage servers, database servers, application servers, and/or web servers configured to run certain software applications and/or provide various storage, database, and/or web services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Many other devices or subsystems may be connected to computing system 100 in FIG. 1 and/or computing system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Computing systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Figure 3:
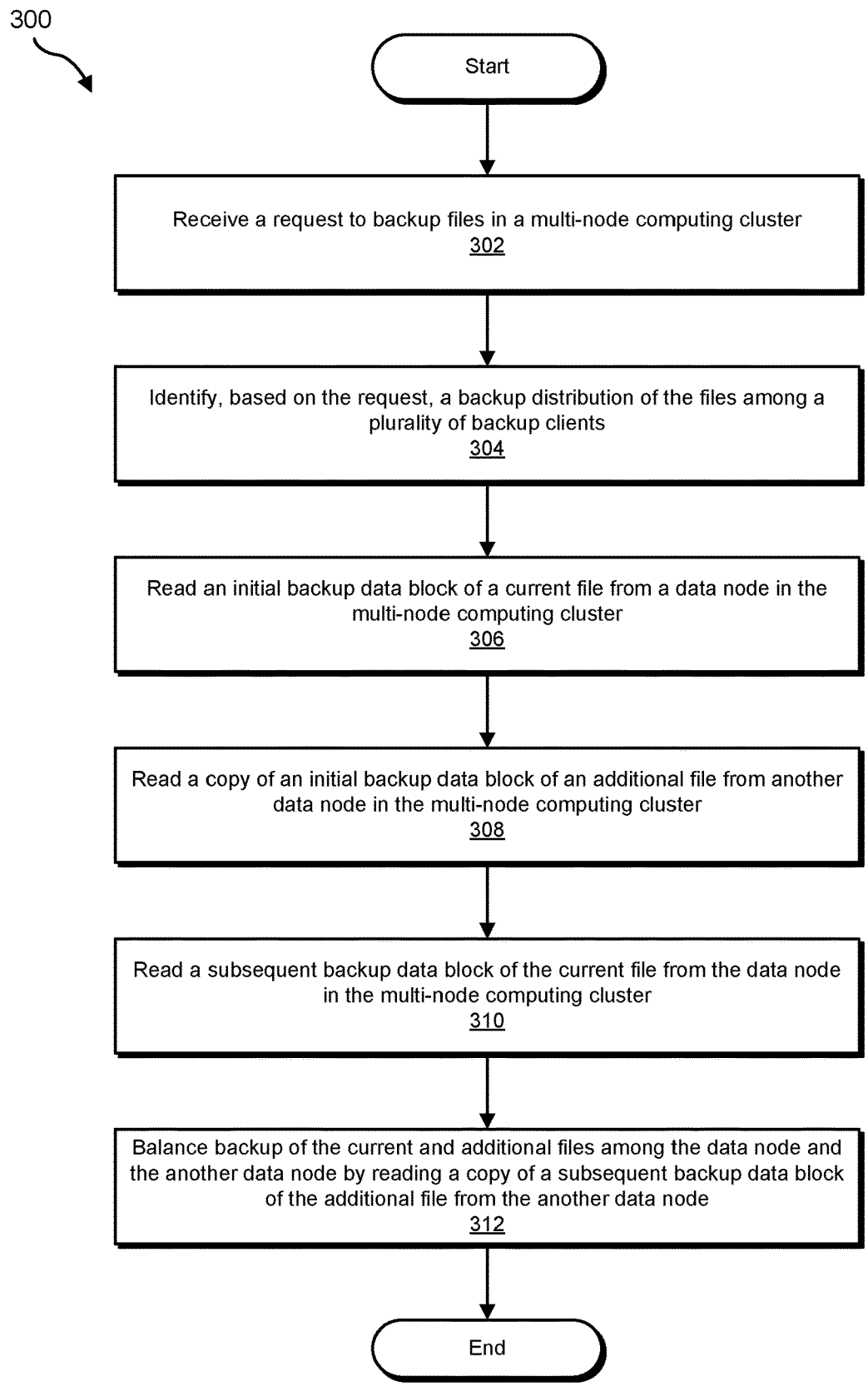
FIG. 3 is a flow diagram of an example method for load balancing backup data.

FIG. 3 is a flow diagram of an example computer-implemented method 300 for load balancing backup data. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may receive a request to backup files in a multi-node computing cluster. For example, reception module 104 may, as part of server 206 in FIG. 2, receive a request to backup files including backup data blocks 124 on the computing devices 202B-202C. The term "multi-node computing cluster," as used herein, generally refers to multiple computing systems representing a number of nodes that operate to provide backup data in response to a data backup request. In one embodiment, a multi-node computing cluster may include a name node and multiple data nodes. The name node may be utilized to receive requests for performing file backups from one or more requesting servers representing one or more proxy clients. The name node (e.g., computing device 202A) may discover the requested backup file data on data nodes in the cluster and distribute a backup workload (e.g., backup distribution data 208) from data nodes (e.g., computing devices 202B-202C) among the proxy clients. For example, backup distribution data 208 may include assigning a first proxy client (e.g., server 206A) to read backup data from computing device 202B and assigning a second proxy client (e.g., server 206B) to read backup data from computing device 202C.

At step 304, one or more of the systems described herein may identify, based on the request received at step 302, a backup distribution of the files among multiple backup clients. For example, identification module 106 may, as part of server 206 in FIG. 2, may identify a backup distribution of the backup data blocks 212 in data nodes 210 from computing device 202. As an example, identification module 106 may retrieve backup distribution data from name node 208 in FIG. 2.

At step 306, one or more of the systems described herein may read an initial backup data block of a current file from a data node in the multi-node computing cluster. For example, the modules 102, as part of server 206A in FIG. 2, may read a first backup data block of a first file from a data node, such as them computing device 202A. As another example, the initial backup data block may not represent the first backup data block of the first file but may represent the first backup data block (e.g., the tenth backup data block) read in the file among multiple other backup data blocks. Thus the term "initial backup data block" may not be indicative of a storage order of backup data blocks in any node. As yet another example, the current file from the data node may not represent the first file but may represent another file (e.g., the second file) among multiple other files in the data node.

At step 308, one or more of the systems described herein may read a copy of the initial backup data block of an additional file from another data node in the multi-node computing cluster. For example, modules 102, as part of servers 206B or 206C in FIG. 2, may read a copy of a first backup data block of a second file from a data node, such as the computing device 202C. As another example, the copy of the initial backup data block may not represent the copy of the first backup data block of the second file but may represent a copy of the first backup data block (e.g., the tenth backup data block) read in the file among multiple other copies of backup data blocks. As yet another example, the additional file from the data node may not represent the second file but may represent another file (e.g., the first file) among multiple other files in the data node. In one embodiment, the copy of the initial backup data block of the additional file may be read in parallel with reading the initial backup data block of the current file from another data node.

At step 310, one or more of the systems described herein may read a subsequent backup data block of the current file from the data node in the multi-node computing cluster. For example, one of the modules 102, as part of server 206A in FIG. 2, may read a subsequent backup data block of a first file from a data node, such as the computing device 202B. As another example, the subsequent backup data block may not directly follow the initial backup data block of the first file but may represent any backup data block (e.g., the tenth backup data block) which follows the initial backup data block among multiple other backup data blocks. Thus, the term "subsequent backup data block" may not be indicative of a storage order of backup data blocks in any node. As yet another example, the current file from the data node may not represent the first file but may represent another file (e.g., the second file) among multiple other files in the data node.

At step 312, one or more of the systems described herein may balance backup of the current and additional files among the data node and the another data node by reading a copy of a subsequent backup data block of the additional file from the another data node in the multi-node computing cluster. For example, modules 102, as part of servers 206B or 206C in FIG. 2, may read a copy of a subsequent backup data block of a second file from a data node, such as the computing device 202C. As another example, the copy of the subsequent backup data block may not directly follow the copy of the initial backup data block of the second file but may represent any copy of a backup data block (e.g., the tenth backup data block) which follows the copy of the initial backup data block among multiple other copies of backup data blocks. In one embodiment, the copy of the subsequent backup data block of the additional file from the data node may be read in parallel with reading the subsequent backup data block of the additional file from another data node.

Figure 4:
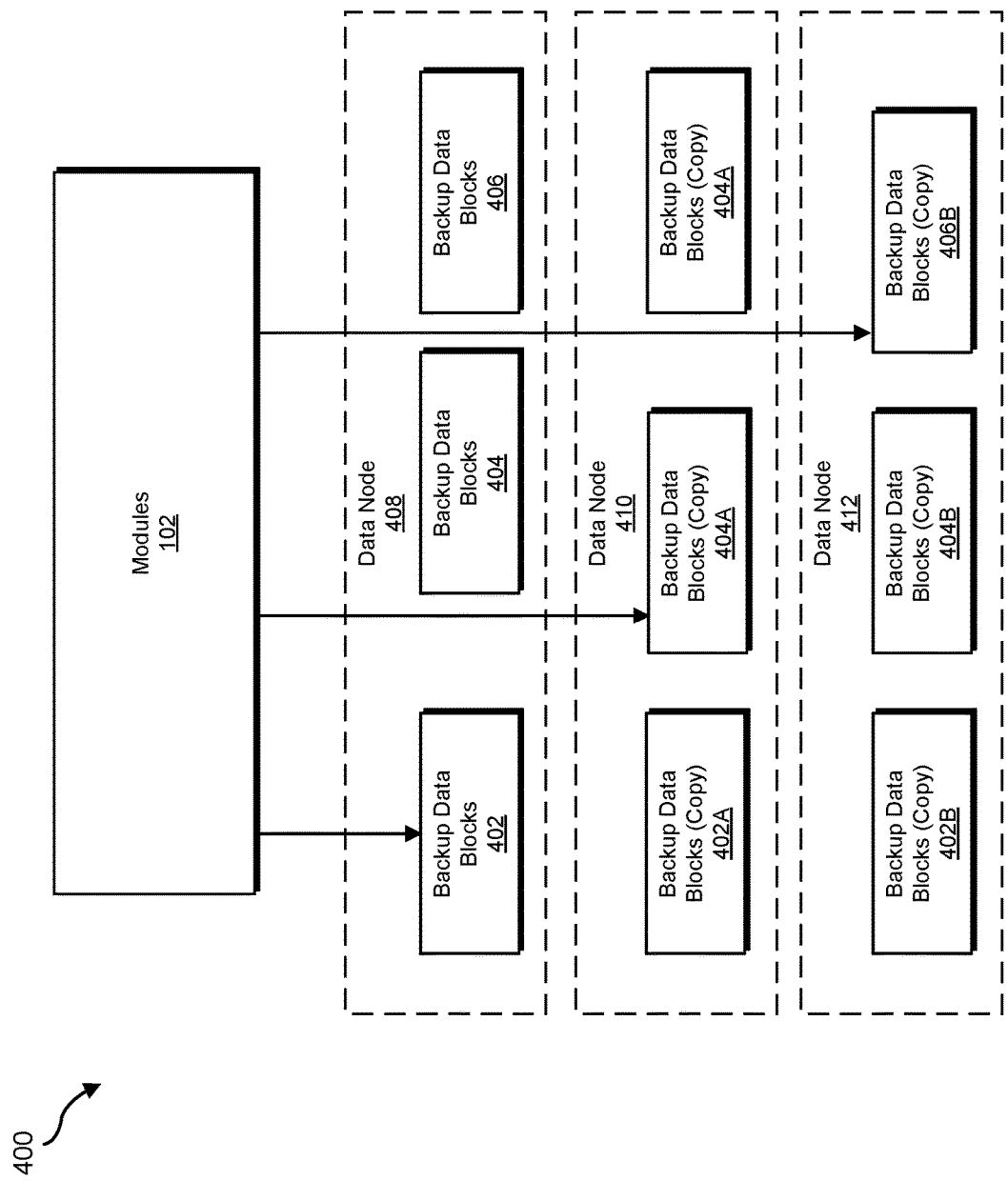
FIG. 4 is a block diagram of an additional example system for load balancing backup data.

FIG. 4 is a block diagram of an additional example system for load balancing backup data. As shown in FIG. 4, modules 102 may read backup data blocks along with replicas of backup data blocks in parallel from multiple data nodes (e.g., data nodes 408, 410, and 412) in a cluster. For example, a first reading module (e.g., a first proxy client) in reading modules 108A-108N may read backup data blocks 402 from data node 408 while a second reading module (e.g., a second proxy client) in reading modules 108A-108N may be scheduled to read backup data blocks 404A from data node 410. Concurrently with the reading of backup data blocks 402 and 404A, a third reading module (e.g., a third proxy client) in reading modules 108A-108N may be scheduled to read backup data blocks 406B from data node 410.

As explained above in connection with FIGS. 1-4, a backup and recovery solution may be utilized to read blocks in parallel from different nodes of a multi-node cluster. For example, backup media servers may exploit the fact that multi-node clusters (e.g., HDFS/HBase clusters) have built-in redundancies such that three copies of each block in a file (e.g., an original and two replicas) are maintained. While performing backup input/output operations, the aforementioned redundancies may be utilized to read blocks in parallel from different nodes of a cluster. Since multiple nodes of the clusters are engaged, the backup and recovery solutions described herein may avoid input/output bottlenecks and improve performance associated with data backups. For example, disk utilization on data nodes in file backup systems may be significantly increased utilizing the backup and recovery solutions described above.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for load balancing backup data, at least a portion of the method being performed by a computing device comprising at least one physical processor, the method comprising:
   receiving a request to backup files in a multi-node computing cluster;
   identifying, based on the request, a backup distribution of the files among a plurality of backup clients;
   reading an initial backup data block of a current file from a data node in the multi-node computing cluster;
   reading a copy of an initial backup data block of an additional file from another data node in the multi-node computing cluster;
   reading a subsequent backup data block of the current file from the data node in the multi-node computing cluster; and
   balancing backup of the current and additional files among the data node and the another data node by reading a copy of a subsequent backup data block of the additional file from the another data node in the multi-node computing cluster.

2. The computer-implemented method of claim 1, further comprising storing at least the initial and subsequent backup data blocks of the current file to a storage system.

3. The computer-implemented method of claim 2, further comprising storing at least the copies of the initial and subsequent backup data blocks of the additional file to a storage system.

4. The computer-implemented method of claim 1, wherein identifying, based on the request, a backup distribution of the files among a plurality of backup clients comprises retrieving backup distribution data from a name node in the multi-node computing cluster.

5. The computer-implemented method of claim 1, wherein reading a copy of the initial backup data block of an additional file from another data node comprises reading the copy of the initial backup data block in parallel with reading the initial backup data block of the current file from the data node.

6. The computer-implemented method of claim 1, wherein reading a copy of the subsequent backup data block of an additional file from the another data node comprises reading the copy of the subsequent backup data block in parallel with reading the subsequent backup data block of the current file from the data node.

7. The computer-implemented method of claim 1, wherein the multi-node computing cluster comprises a Hadoop Distributed File System (HDFS).

8. A system for load balancing backup data, the system comprising:
   a reception module, stored in memory, that receives a request to backup files in a multi-node computing cluster;
   an identification module, stored in memory, that identifies, based on the request, a backup distribution of the files among a plurality of backup clients;
   a backup reading module, stored in memory, that:
     reads an initial backup data block of a current file from a data node in the multi-node computing cluster; and
     reads a subsequent backup data block of the current file from the data node in the multi-node computing cluster; and
   another backup reading module, stored in memory, that:
     reads a copy of the initial backup data block of an additional file from another data node in the multi-node computing cluster; and
     balances backup of the current and additional files among the data node and the another data node by reading a copy of the subsequent backup data block of the additional file from the another data node in the multi-node computing cluster; and
   at least one physical processor that executes the reception module, the identification module, the backup reading module, and the another backup reading module.

9. The system of claim 8, further comprising a storage module to further store at least the initial backup data block of the current file, the subsequent backup data block of the current file, the copy of the initial backup data block of the additional file, and the copy of the subsequent backup data block of the additional file to a storage system.

10. The system of claim 9, wherein the identification module identifies a backup distribution of the files among a plurality of backup clients by retrieving backup distribution data from a name node in the multi-node computing cluster.

11. The system of claim 8, wherein the reading module reads a copy of the initial backup data block of an additional file from the another data node by reading the copy of the initial backup data block in parallel with reading the initial backup data block of the current file from the data node.

12. The system of claim 8, wherein the reading module reads a copy of the subsequent backup data block of the additional file from the another data node by reading the copy of the subsequent backup data block in parallel with reading the subsequent backup data block of the additional file from the data node.

13. The system of claim 8, wherein the multi-node computing cluster comprises a Hadoop Distributed File System (HDFS).

14. A non-transitory computer-readable medium comprising one or more computer-executable instructions that, when executed by at least one processor of a computing device, cause the computing device to:

receive a request to backup files in a multi-node computing cluster;

identify, based on the request, a backup distribution of the files among a plurality of backup clients;

read an initial backup data block of a current file from a data node in the multi-node computing cluster;

read a copy of the initial backup data block of an additional file from another data node in the multi-node computing cluster;

read a subsequent backup data block of the current file from the data node in the multi-node computing cluster; and balance backup of the initial and additional files among the data node and the another data node by reading a copy of the subsequent backup data block of the additional file from the another data node in the multi-node computing cluster.

15. The non-transitory computer-readable medium of claim 14, wherein the one or more computer-readable instructions further cause the computing device to store at least the initial and subsequent backup data blocks of the current file to a storage system.

16. The non-transitory computer-readable medium of claim 15, wherein the one or more computer-readable instructions further cause the computing device to store the copies of the initial and subsequent backup data blocks of the additional file to the storage system.

17. The non-transitory computer-readable medium of claim 14, wherein the one or more computer-readable instructions cause the computing device to identify, based on the request, a backup distribution of the files among a plurality of backup clients by retrieving backup distribution data from a name node in the multi-node computing cluster.

18. The non-transitory computer-readable medium of claim 14, wherein the one or more computer-readable instructions cause the computing device to read a copy of the initial backup data block of an additional file from the another data node by reading the copy of the initial backup data block in parallel with reading the initial backup data block of the current file from the data node.

19. The non-transitory computer-readable medium of claim 14, wherein the one or more computer-readable instructions cause the computing device to read a copy of a subsequent backup data block of the additional file from the another data node by reading the copy of the subsequent backup data block in parallel with reading the subsequent backup data block of the additional file from the data node.

20. The non-transitory computer-readable medium of claim 14, wherein the multi-node computing cluster comprises a Hadoop Distributed File System (HDFS).

* * * * *